United States Patent [19]

Nojiri et al.

[11] 4,367,185

[45] Jan. 4, 1983

[54] METHOD OF PRODUCING CROSSLINKED POLYPROPYLENE FOAM

[75] Inventors: Akio Nojiri, Yokohama; Takashi Sawasaki; Toshio Koreeda, both of Tokyo, all of Japan

[73] Assignee: The Furukawa Electric Co., Ltd., Tokyo, Japan

[21] Appl. No.: 124,519

[22] Filed: Feb. 25, 1980

[51] Int. Cl.³ .............................................. B29D 27/00
[52] U.S. Cl. .................................. 264/22; 204/159.17; 204/159.2; 264/53; 264/54; 264/DIG. 16; 521/140
[58] Field of Search .................. 264/22, DIG. 16, 54, 264/53; 204/159.2, 159.17; 521/140

[56] References Cited

U.S. PATENT DOCUMENTS

| | | | |
|---|---|---|---|
| 3,067,147 | 12/1962 | Rubens et al. | 264/50 |
| 3,542,702 | 11/1970 | Okada et al. | 521/140 |
| 3,714,083 | 1/1973 | Nakayama et al. | 521/140 |
| 3,717,559 | 2/1973 | Oyama et al. | 521/140 |
| 3,965,054 | 6/1976 | Nojiri et al. | 521/140 |
| 4,049,757 | 9/1977 | Kammel et al. | 264/22 |
| 4,097,319 | 6/1978 | Shimokawa et al. | 264/22 |
| 4,203,815 | 5/1980 | Noda et al. | 521/140 |
| 4,213,925 | 7/1980 | Kiyono et al. | 264/22 |

FOREIGN PATENT DOCUMENTS 1126857  9/1968  United Kingdom ................ 521/140

*Primary Examiner*—Jeffery R. Thurlow
*Attorney, Agent, or Firm*—Frishauf, Holtz, Goodman & Woodward

[57] ABSTRACT

In producing a crosslinked polypropylene foam, 0.5 to 4 parts by weight of a compound selected from triacrylate and trimethacrylate of aliphatic polyhydric alcohol and a blowing agent are mixed with 100 parts by weight of propylene homopolymer or copolymer. Then, the mixture is shaped under heat, followed by irradiation with an ionizing radiation such that the dose of the radiation absorbed by the shaped mass ranges between 0.1 and 10 Mrad. Finally, the irradiated mass is heated for foaming.

12 Claims, No Drawings

METHOD OF PRODUCING CROSSLINKED POLYPROPYLENE FOAM

This invention relates to a method of producing a crosslinked polypropylene foam having a good thermoformability and a high elongation.

There is an increasing demand in the automobile industry for plastic materials in view of requirement of light materials. Among the demanded plastic materials is a plastic foam of high performance including, for example, a foam of high expansion degree low density exhibiting a good thermal processing property, a high flexibility and a high heat resistance, which is used as an interior material or cushioning material of automobiles. Demand for plastic materials is also on the increase in the field of home electrical appliances. Particularly, a strong demand is directed to a material resistant to the heat of about 120° C. and satisfactory in thermoformability which is used as an insulating material of hot water pipes and air conditioner pipes.

A crosslinked polyethylene foam widely available on the market is unsatisfactory in heat resistance, failing to meet the above-noted demand. On the other hand, a commercially available crosslinked polypropylene foam produced by Japanese Pat. No. 645946 has been found unsatisfactory in thermoformability, low in elongation and easy to be deteriorated with time, also failing to meet the above-noted demand. Namely, the crosslinked polypropylene foam sheet was actually subjected to deep drawing under heat, with the result that the produced article was broken at the edge portion having a large curvature. The experiment has clarified that it is very difficult to apply deep drawing to the crosslinked polypropylene foam sheet at a drawing rate of 0.7 or more. It has also been found that a piping insulator formed of a crosslinked polypropylene foam sheet commercially available has an elongation of as small as about 100%. Further, a copper pipe covered with the above-noted insulator, 6 mm in thickness and 28 mm in outer diameter, was bent by 90° at a bending radius of 200 mm, with the result that the insulator was elongated and broken on the outer side of the bent portion. Still further, a crosslinked polypropylene foam commercially available is deteriorated so much if continuously exposed to the heat of 100° C. or more that the foam is rendered substantially unusable in a short period of time.

An object of this invention is to provide a crosslinked polypropylene foam free from the drawbacks described above.

According to this invention, there is provided a method of producing a crosslinked polypropylene foam, comprising the steps of mixing 0.5 to 4 parts by weight of triacrylate or trimethacrylate of aliphatic polyhydric alcohol and a blowing agent with 100 parts by weight of propylene homopolymer or copolymer, shaping the mixture under heat into, for example, a sheet, irradiating the shaped mass with an ionizing radiation such that the absorbed dose ranges between 0.1 and 10 Mrad, and heating the irradiated mass for foaming.

In another embodiment of this invention, a shaped mass which does not contain a blowing agent is irradiated with an ionizing radiation, followed by, for example, impregnating the irradiated mass with a volatile blowing agent and, then, heating for foaming.

The crosslinked polypropylene foam produced by the method of this invention is substantially equal in heat resistance and flexibility and superior in elongation and heat aging property to the crosslinked polypropylene foam which is commercially available. Because of good thermal elongation, the foam produced by the method of the present invention exhibits an excellent thermoformability, particularly, vacuum forming property and compression molding property.

The term "polypropylene" used herein covers propylene homopolymer and copolymer between propylene and α-olefins such as ethylene and butene-1. Polypropylene containing 1 to 15% by weight of ethylene as a comonomer and having a melt index (MI) of 1 to 20 is preferable in this invention. Random copolymer or block copolymer between propylene and 2 to 9% by weight of ethylene is more preferable for use as the polypropylene. The propylene homopolymer or copolymer may be mixed with ethylene polymers such as polyethylene having a MI of 1 to 20 and copolymers between ethylene and comonomers like propylene, vinyl acetate, acrylic acid, and ethylacrylate. The polymer used in this invention should preferably have an MI of 1 to 20. It is difficult to knead and shape a polymer having an MI smaller than 1. On the other hand, a polymer having an MI larger than 20 is difficult to be shaped into a sheet.

In this invention, it is possible to use a thermal decomposition type blowing agent or a volatile blowing agent. The thermal decomposition type blowing agent is selected from, for example, azodicarbonamide, dinitrosopentamethylenetetramine, p-toluenesulfonyl semicarbazide, barium azodicarboxylate, hydrazodicar bonamide and trihydrazine triazine. For obtaining a good foam having uniform fine cells, the blowing agent should not be decomposed as much as possible in the step of kneading under heat a mixture of the polymer, blowing agent and other additives. For example, it is preferable to use a blowing agent which does not generate a gas for at least 5 minutes when heated at 185° C. More preferably, it takes at shortest 10 minutes for the blowing agent to begin to generate decomposed gas at 185° C. The thermal decomposition property of the blowing agent is determined as follows. Specifically, a conical flask having an inner volume of 100 cc is charged with 10 cc of paraffin. Then 0.5 g of a blowing agent is dispersed in the paraffin and a gas burette serving to detect the generated gas is connected to the flask. Under this condition, the flask is immersed in a silicone oil bath maintained at 185° C. for measuring the period of time between the immersion and initiation of gas generation.

The volatile blowing agent used in this invention should be highly permeable into the polymer because the volatile blowing agent should be introduced into a shaped mass irradiated with an ionizing radiation, not by mixing, but by impregnation.

In this invention, triacrylate or trimethacrylate of aliphatic polyhydric alcohol is used as the crosslinking agent. Specific compounds providing the crosslinking agent include, for example, trimethylol propane triacrylate, trimethylol propane trimethacrylate, trimethylol ethane triacrylate and tetramethylol methane triacrylate. Particularly preferable are trimethylol propane triacrylate and trimethylol propane trimethacrylate. The crosslinking agent in an amount of 0.5 to 4 parts by weight should be added to 100 parts by weight of polypropylene. Trimethylol propane triacrylate and trimethylol propane trimethacrylate are highly compatible with polypropylene and exhibit a high crosslinking effect and, thus, are very suitable for crosslinking-foaming. Preferably, the amount of crosslinking agent, which however, differs depending on the MI of polypropylene, dose of ionizing radiation and degree of foaming expansion, ranges between 1.0 and 2.5 parts by weight.

Triacrylate or trimethacrylate of aliphatic polyhydric alcohol used in this invention permits crosslinking polypropylene with a small dose of ionizing radiation, rendering it possible to suppress markedly the polypropylene deterioration owing to the irradiation. Polypropylene in itself tends to be oxidized in air so easily that peroxy radicals are formed even by the irradiation, leading to deterioration. Therefore, it is very important to achieve crosslinking efficiently with a small dose of radiation. As mentioned above, triacrylate or trimethacrylate of aliphatic polyhydric alcohol used in this invention permits crosslinking polypropylene effectively with a small dose of radiation. As a result, the produced foam exhibits a good thermoformability, a high elongation and a low deterioration. It should also be noted that the above mentioned triacrylate and trimethacrylate contained in a polypropylene compound do not bleed. Thus, a foaming compound containing the triacrylate or trimethacrylate, even if left for more than, for example, 5 months, permits producing a satisfactory crosslinked foam. Incidentally, it is impossible to preserve for a long period of time a foaming compound containing a conventional crosslinking agent of a polyfunctional monomer.

The crosslinking degree of polypropylene required for foaming is generally 15 to 65%, preferably, 20 to 50% in terms of gel content. If the gel content is higher than 65%, large voids are formed within the cellular texture, failing to provide a satisfactory foam. On the other hand, a gel content lower than 15% leads to a foam unsatisfactory in elastic recovery.

Derivatives of phenolic compound may also be used in this invention, said derivatives including, for example, 2,6-di-t-butyl-4-methyl phenol; 2,5-dimethyl hydroquinone; 2,2-bis(4-hydroxy-3,5-dimethyl phenyl) propane; 2,4,6-trimethyl phenol; bis(4-hydroxy-3,5-di-t-butyl phenyl) sulfide; bis(2-hydroxy-3,5-dimethylphenyl) methane; bis(3-hydroxy-2,5-tetramethylphenyl) methane; 1,3,5-trimethyl-2,4,6-tris-(3,5-di-t-butyl-4-hydroxybenzyl) benzene; 1,1,3-tris-(5-t-butyl-4-hydroxy-2-methylphenyl) butane; octadecyl-3-(3',5'-di-t-butyl-4'-hydroxyphenyl) propionate; pentaerythrityl-tetrakis [3-(3,5-di-t-butyl-4-hydroxyphenyl) propionate]; and tris-(3,5-di-t-butyl-4-hydroxybenzyl) isocyanurate. Particularly preferable are compounds having at least three hydroxyl groups such as 1,1,3-tris-(5-t-butyl-4-hydroxy-2-methylphenyl) butane; octadecyl-3-(3',5'-di-t-butyl-4'-hydroxyphenyl)-propionate; tris-(3,5-di-t-butyl-4-hydroxybenzyl) isocyanurate and 1,3,5-trimethyl-2,4,6-tris (3,5-di-t-butyl-4-hydroxybenzyl) benzene.

The phenolic compound derivative serves to enhance the crosslinking effect even if the amount thereof is very small. In addition, if the foaming is carried out in the air in the absence of the phenolic compound derivative, the produced foam tends to shrink. The reason for the shrinking is unclear. But, it is supposed that the irradiation and heating to cause foaming in the air bring about a marked decomposition reaction of the resin molecules. Thus, the resin is rendered incapable of retaining the decomposition gas of the blowing agent, leading to the shrinkage of the produced foam. However, the phenolic compound derivative, if present, is thought to suppress the decomposition reaction of the resin molecules.

The amount of the phenolic compound derivative should range from 0.01 to 5.0 parts by weight. If the amount exceeds 5.0 parts by weight a bad influence is given to the crosslinking reaction. On the other hand, the particular effects described above can not be produced if the amount of the phenolic compound derivative is smaller than 0.01 part by weight. Preferably, 0.05 to 1.0 part by weight of a phenolic compound derivative having at least three by hydroxyl groups should be used in this invention.

The effects of the components of the foamable composition described above are combined to produce a synergetic effect when the composition is subjected to the crosslinking and foaming treatment, thereby producing a foam of such excellent properties as described previously. Further, the produced foam having fine cells exhibits a high elasticity and bears a smooth and lustrous leather-like skin layer.

In this invention, the foamable polypropylene composition is shaped under temperatures lower than the decomposition temperature of the blowing agent but higher than the softening temperature of the resin. In general, a kneading-shaping combination such as a kneader and an extruder, a Banbary mixer and a press or a roll and a press is used for shaping the foamable composition. Triacrylate or trimethacrylate of aliphatic polyhydric alcohol contained in the foamable composition is thermally activated in this shaping step. Where a phenolic compound derivative is contained in the composition, graft reaction to the resin and partial crosslinking reaction are caused in the shaping step under the accelerating function of the phenolic compound derivative. Preferably, the shaping should be carried out at 160° to 180° C. for not more than 10 minutes. It is difficult to knead the composition uniformly at a temperature lower than 160° C. On the other hand, the blowing agent is decomposed at a temperature higher than 180° C.

The ionizing radiation used in this invention includes, for example, γ-ray and β-ray emitted from radioactive isotopes, electron beam generated from electron beam accelerator, x-rays, and ultraviolet light generated from a low pressure mercury lamp. The amount of radiation should range between 0.1 and 10 Mrad in terms of absorbed dose. For suppressing the deterioration of the produced foam and permitting a satisfactory foaming, the absorbed dose should preferably range between 0.5 and 5 Mrad, more preferably, between 1 and 3 Mrad. A satisfactory crosslinking can not be achieved if the absorbed dose is less than 0.1 Mrad. On the other hand, an absorbed dose more than 10 Mrad causes excessive crosslinking, rendering it impossible to bring about sufficient foaming.

The foamable shaped composition irradiated with the ionizing radiation is heated, immediately or some time after the irradiation to a temperature higher than the decomposition temperature of the blowing agent so as to cause foaming of the composition. The heating is effected by employing a hot air stream, steam, infrared ray, metal bath, oil bath, salt bath, etc. In general, the heating temperature ranges between 200° and 300° C.

In the general method of producing a crosslinked polyolefin foam sheet, it is necessary to dispose the foamable sheet on a support member in the step of heating for foaming. Otherwise, the softened sheet is caused to elongate downward by its own weight, resulting in breakage. It is also necessary for the heat to be transmitted uniformly into the sheet. Suppose the upper surface region of the sheet has been heated more rapidly than the lower surface region. In this case, the upper surface region alone is expanded first, with the result that the sheet is deformed into a curl-like shape and partial adhesion takes place.

Under the circumstances, it is proposed to dispose the foamable sheet on a wire net in the step of heating for foaming. Certainly, the use of a wire net permits efficiently transmitting the heat into the sheet and decreasing the contact area between the wire net and the sheet, thus rendering less sticking therebetween. But, some difficulties remain unsolved. Specifically, a molten composition in direct contact with the wire net is expanded by foaming in three-dimensional directions. Naturally, friction accompanies the relative movement between the wire net and the expanding resin sheet. It follows that the sticking adhesion is readily brought about depending on the composition of the resin sheet as well as on the physical and chemical conditions of the surface of the resin sheet, resulting in that an isotropic expansion of the sheet is prevented and the produced foam sheet fails to have a smooth surface.

Incidentally, a conventional foamable polypropylene composition sheet irradiated with radiation was actually heated for foaming on a wire net conveyer. In this case, sticking was recognized between the sheet and the wire net, with the result that an unpleasant impression of the sticking was found on one surface of the produced foam sheet. It is supposed that the radiation caused a chemical change on the surface of the composition sheet, leading to the occurrence of the sticking.

A wire net is used in this invention, too, as a support member for a foamable polypropylene composition sheet crosslinked by irradiation in the step of heating for foaming with satisfactory results. Specifically, the sheet of the particular composition specified in this invention does not stick to the wire net in the foaming step and is isotropically expanded as if the expanding sheet was supported with nothing. Naturally, the produced foam exhibits a smooth and lustrous leather-like surface free from an impression of the wire net, partial shrinkage, etc.

In this invention, it is possible to use other materials compatible with polypropylene such as another thermoplastic resin, natural rubber and synthetic rubber together with polypropylene. It is also possible to add fillers such as glass fiber, asbestos, calcium carbonate, gypsum and silica; pigment; softener; lubricant; antioxidant, antistatic agent; and flame retardants such as antimony trioxide and chlorinated pafaffin.

EXAMPLE 1

A mixture consisting of 100 parts by weight of propylene-ethylene block copolymer having a melt index of 20 and containing 6% of ethylene units, 15 parts by weight of azodicarbonamide, 1.8 parts by weight of trimethylol propane trimethacrylate and 0.08 part by weight of tris-(3,5-di-t-butyl-4-hydroxybenzyl) isocyanurate was extruded into a sheet 1.5 mm thick by using a 2-inch extruder maintained at 180° C. The block copolymer mentioned contained 10% by weight of atactic polypropylene and it took 15 minutes for azodicarbonamide to begin to generate gas at 185° C. Further, the gel content of the sheet immediately after the extrusion was 13.7% by weight.

Small sheets, each sized at 5 cm×5 cm were cut from the extruded sheet, which were divided into two groups, and irradiated by using $\gamma$-radiation source of cobalt-60, one group immediately after the extrusion and the other group 96 hours after the extrusion, such that the absorbed dose for each group was 2 Mrad. The irradiated small sheets were placed on a wire net housed in a constant temperature bath maintained at 230° C. for effecting foaming for 5 minutes, thereby obtaining a foam of fine uniform cells having a density of 0.033 g/cm$^3$ for each group. The produced foam for each group was found to have a lustrous leather-like surface free from a wire net pattern. Further, the foam exhibited a good vacuum forming property and, when subjected to a box-shaped deep drawing, was not broken at the edge portions.

Control 1

An extrudate sheet was prepared as in Example 1, except that 4.0 parts by weight of divinyl benzene widely used as a conventional irradiation crosslinking additive was substituted for trimethylol propane trimethacrylate used in Example 1. A gel content was not contained at all in the sheet immediately after the extrusion. The sheet was irradiated immediately after the extrusion and 96 hours after the extrusion at the absorbed dose of 2 Mrad, 5 Mrad and 8 Mrad, respectively, followed by foaming as in Example 1. A wire net pattern was recognized on the surface of the produced foam. Table 1 shows the density of the produced foam.

TABLE 1

| Irradiation | Density of Foam (g/cm$^3$) | | |
|---|---|---|---|
| | 2 Mrad | 5 Mrad | 8 Mrad |
| Immediately after extrusion | 0.046 | 0.040 | 0.040 |
| 96 hours after extrusion | 0.058 | 0.063 | 0.056 |

Table 1 shows that the foam of Control 1 was higher in density than that of Example 1. Also, a change with time in density was recognized in the foam of Control 1.

Control 2

A mixture consisting of 100 parts by weight of the same polypropylene powder (less than 80 meshes) as used in Example 1, 2 parts by weight of trimethylol propane trimethacrylate, 0.2 part by weight of dicumyl peroxide and 10 parts by weight of azodicarbonamide was shaped into a sheet by using a press maintained at 180° C. Another sheet was prepared similarly except that the amount of dicumyl peroxide was increased to 0.4 part by weight. These two sheets were put in a hot-air constant temperature bath maintained at 220° C. for effecting foaming, with the result that the produced foam for each case and a density of 0.38 g/cm$^3$. In other words, the expansion degree of the sheet was very low. In addition, the gel content of the sheet was as low as about 10%, i.e., the degree of crosslinking was very low. An additional experiment was conducted by using trimethylol propane triacrylate in place of trimethylol propane trimethacrylate, with substantially the same result.

Control 2 clearly suggests that the crosslinking agent as used in this invention fails to perform a sufficient crosslinking reaction in the case of an ordinary foaming method employing an organic peroxide like dicumyl peroxide. It is also suggested that a foam of a high expansion degree can not be obtained from polypropylene with a crosslinking degree of the above-noted level.

EXAMPLE 2

A mixture consisting of 100 parts by weight of isotactic polypropylene (MI=20) and 2.0 parts by weight of a polyfunctional monomer shown in Table 2 was extruded at 190° C. into a sheet 2 mm thick. Polyfunctional monomers 1 to 5 shown in Table 2 are those used in the conventinal technique and monomers 7 and 8 are those specified in this invention. Monomer 6 was used as control each of the extruded sheets was irradiated with electron beam at the absorbed dose of 3 Mrad. Table 2 also shows the gel content of the irradiated sheet.

TABLE 2

| No. | Polyfunctional Monomer | Gel Content |
|---|---|---|
| 1 | Divinyl benzene | 38% |
| 2 | Triallylcyanurate | 41% |
| 3 | Hydroquinone dimethacrylate | 51% |
| 4 | Diallyl phthalate | 22% |
| 5 | Ethyleneglycol diacrylate | 32% |
| 6 | Pentaerythritol tetracrylate | 46% |
| 7 | Trimethylol propane triacrylate | 76% |
| 8 | Trimethylol propane triacrylate and tris-(3,5-di-t-butyl-4-hydroxybenzyl) isocyanurate (0.1 part by weight) as a phenolic compound derivative | 83% |

Table 2 shows that polyfunctional monomer 7 specified in this invention is prominently advantageous in crosslinking effect over conventional polyfunctional monomers 1 to 5, and control monomer 6. It is also shown that the crosslinking effect is further enhanced by the use of an phenolic compound derivative (No. 8).

EXAMPLE 3

A mixture consisting of 100 parts by weight of propylene-ethylene block copolymer powder containing 6% by weight of ethylene units, 15 parts by weight of azodicarbonamide, 2.0 parts by weight of trimethylol ethane triacrylate and 0.3 part by weight of a phenolic compound derivative, i.e., 1,3,5-trimethylol-2, 4, 6-tris(3,5-di-t-butyl-4-hydroxybenzyl) benzene was extruded into a sheet 2 mm thick by using an extruder of 40 mm diameter. The block copolymer had a melt index of 10 and it took 18 minutes for azodicarbonamide to begin to generate gas at 185° C.

The extruded sheet was irradiated 120 hours after the extrusion with γ-ray of cobalt-60 at the absorbed dose of 2 Mrad. Then, a small piece (5 cm×5 cm) cut from the irradiated sheet was placed on a wire net housed in a hot-air constant temperature bath maintained at 230° C. for effecting foaming thereby obtaining a foam of uniform fine cells having a density of 0.035 g/cm³ and a lustrous surface.

EXAMPLE 4

The foams obtained in Example 1 and Control 1 were subjected to tensile strength test, elongation test and folding test. In the folding test, a test piece 2 cm in width and 8 cm in length was repeatedly bent 8 times at the center by 180°. Table 3 shows the results.

TABLE 3

| | Tensile Strength | Elongation | Folding |
|---|---|---|---|
| Foam of Example 1 | 7 kg/cm² | 160% | not broken |
| Foam of Control 1 (absorbed dose of 8 Mrad) | 4.3 kg/cm² | 55% | Cracked |

Table 3 shows that this invention is superior to the prior art in various properties of the foam.

EXAMPLE 5

Each of compositions 1 to 3 shown in Table 4 was added to 100 parts by weight of a polypropylene mixture consisting of 80% by weight of propylene-ethylene random copolymer having a melt index of 10 and containing 4.0% by weight of ethylene units and 20% by weight of a low density polyethylene having a melt index of 2. The resultant composite material was extruded into a sheet 1.2 mm thick by using an extruder of 40 mm diameter. Then, the extruded sheeet was irradiated with electron beam, thereafter heated at 230° C. on a wire net conveyor, in a foaming furnace. Table 4 also shows the properties of the produced foam.

TABLE 4

| | Composition 1 | Composition 2 | Composition 3 |
|---|---|---|---|
| Blowing agent* | ADCA (15 parts by weight) | ADCA (15 parts by weight) | ADCA (15 parts by weight) |
| Crosslinking agent | Trimethylol propane triacrylate (1.8 parts by weight) | Triallylcyanurate (2.6 parts by weight) | Pentaerythritol tetraacrylate (2.6 parts by weight) |
| Phenolic compound derivative | Irganox 1010** (0.3 part by weight) | Irganox 1010 (0.3 part by weight) | Irganox 1010 (0.3 part by weight) |
| Absorbed dose | 2.0 Mrad | 6.8 Mrad | 5.2 Mrad |
| Density | 0.034 g/cc | 0.048 g/cc | 0.040 g/cc |
| Compression molding property | good | bad | bad |
| Elongation | 205% | 95% | 120% |
| Aging test*** | 66% | 25% | 40% |

*Blowing agent . . . It took 16 minutes for azodicarbonamide (ADCA) to begin to generate decomposed gas at 185° C.
**Irganox 1010 . . . Trade name of pentaerythrityl-tetrakis [3-(3,5-di-t-butyl-4-hydroxyphenyl) propionate]
***Aging test . . . Percentage of elongation retention after the foam was kept at 135° C. for 4 days.

Table 4 shows that the foam involving composition 1 was satisfactory in every respect. In fact, the foam for this case had a smooth leather-like surface. In contrast, problems remained unsolved in the foams involving compositions 2 and 3.

EXAMPLE 6

A mixture consisting of 100 parts by weight of propylene-ethylene copolymer having a melt index of 6 and containing 4% by weight of ethylene units, 0.3 part by weight of a phenolic compound derivative, i.e., pentaerythrityl-tetrakis [3-(3,5-di-t-butyl-4-hydroxyphenyl) propionate], 1.6 parts by weight of trimethylol propane triacylate and 15 parts by weight of azodicarbonamide was shaped into a sheet 1.5 mm thick. Another sheet was prepared similarly except that 2.0 parts by weight of triallylisocyanurate was substituted for 1.6 parts by weight of trimethylol propane triacrylate mentioned above. Each of these two sheets was irradiated with electron beam at various absorbed dose, followed by foaming in a hot-air constant temperature bath maintained at 230° C. Table 5 shows the gel content and elongation of the produced foam.

TABLE 5

| Absorbed dose (Mrad) | Trimethylol propane-triacrylate | | Triallylisocyanurate | |
|---|---|---|---|---|
| | Gel content (%) | Elongation (%) | Gel content (%) | Elongation (%) |
| 0 | 0 | (not foamed) | 0 | not foamed |
| 1 | 55 | 180 | 0 | not foamed |
| 2 | 64 | 150 | 5 | not foamed |
| 4 | 59 | 110 | 20 | 100 |
| 10 | 50 | 20 | 45 | 15 |
| 20 | 34 | 3 | 30 | 5 |

Table 5 shows that the elongation is markedly decreased in accordance with increase in the absorbed dose. In other words, the absorbed dose permitting the composition of this invention to exhibit a gel content sufficient for foaming is very small, with the result that the composition of this invention is capable of avoiding deterioration.

EXAMPLE 7

A mixture consisting of 100 parts by weight of the same polypropylene mixture as used in Example 5, 2.0 parts by weight of trimethylol propane trimethacrylate and 15 parts by weight of azodicarbonamide shown in Table 6 was irradiated with electron beam at the absorbed dose of 2.3 Mrad, followed by extruding the mixture at 165° C. in a sheet by using an extruder of 40 mm diameter. The extruded sheet was foamed at 230° C. in a foaming furnace provided with a wire net conveyor, with the results as shown in Table 6.

TABLE 6

| Decomposition property* | Azodicarbonamide (blowing agent) | | |
|---|---|---|---|
| | (A) 4 minutes | (B) 8 minutes | (C) 12 minutes |
| Condition in extrusion step | mixing of large amount of bubbles into sheet | mixing of bubbles into sheet surface region | Smooth sheet |
| Foam appearance | Coarse surface having innumerable large cells | Somewhat unsatisfactory in surface smoothness | Smooth and lustrous surface |
| Density | 0.187 g/cc | 0.045 g/cc | 0.032 g/cc |

*Decomposition property ... Time required for initiation of gas generation at 185° C.

It is clearly seen that the decomposition property of the blowing agent markedly influences the density and appearance of the product foam.

EXAMPLE 8

A mixture consisting of 100 parts by weight of propylene-ethylene block copolymer having a melt index of 10 and containing 8% by weight of ethylene units, 1.8 parts by weight of trimethylol propane triacrylate, 0.5 part by weight of talc and 0.2 part by weight of 1,3,5-trimethyl-2,4,6-tris-(3,5-di-t-butyl-4-hydroxybenzyl) benzene was extruded into a sheet 2 mm thick by using an extruder of 65 mm diameter. The extruded sheet was irradiated with electron beam at the absorbed dose of 2 Mrad. Then, a sample sheet sized at 5 cm×5 cm, which was cut from the irradiated sheet, was left immersed for 24 hours in Freon 11 (trichloromonofluoromethane) maintained at 60° C. After the immersion, the sample sheet was wrapped in an aluminum foil and put in a metal bath maintained at 220° C. The sheet was taken out of the metal bath 4 minutes later, thereby obtaining a foam of fine cells having a density of 0.035 g/cc.

What we claim is:

1. A method of producing a crosslinked polypropylene foam shaped body, comprising the steps of:
    mixing 0.5 to 4 parts by weight of a compound selected from the group consisting of trimethylol propane triacrylate and trimethylol propane trimethacrylate, 0.1 to 5 parts by weight of a phenolic compound having at least 3 hydroxyl groups in the molecule and a blowing agent, with 100 parts by weight of propylene homopolymer or copolymer,
    shaping the mixture under heat,
    irradiating the shaped mass with an ionizing radiation such that the absorbed dose ranges between 0.1 and 5 Mrad, and
    heating the irradiated mass to foam the shaped body.
2. A method of producing a crosslinking polypropylene foam, comprising the steps of:
    mixing 0.5 to 4 parts by weight of a compound selected from the group consisting of trimethylol propane triacrylate and trimethylol propane trimethacrylate, 0.1 to 5 parts by weight of a phenolic compound having at least 3 hydroxyl groups in the molecule with 100 parts by weight of propylene homopolymer or copolymer,
    shaping the mixture under heat,
    irradiating the shaped mass with an ionizing radiation such that the absorbed dose ranges between 0.1 and 5 Mrad,
    impregnating the irradiated mass with a volatile blowing agent, and
    heating the impregnated mass to foam the shaped body.
3. The method according to claim 1, wherein it takes at least 5 minutes for the blowing agent to begin to generate decomposed gas at 185° C.
4. The method according to claim 1, wherein it takes at least 10 minutes for the blowing agent to begin to generate decomposed gas at 185° C.
5. The method according to claim 1, wherein said compound is trimethylol propane triacrylate.
6. The method according to claim 1, wherein said compound is trimethylol propane trimethacrylate.
7. The method according to claim 1, wherein the amount of said triacrylate or trimethacrylate ranges between 1.0 and 2.5 parts by weight.
8. The method according to claim 1, or 2 or 7 wherein the absorbed dose of ionizing radiation ranges between 0.5 and 5 Mrad.
9. The method according to claim 1, or 2 or 7 wherein the absorbed dose of ionizing radiation ranges between 1 and 3 Mrad.
10. The method according to claim 1, wherein the irradiated mass is placed on a wire net and heated for foaming.
11. The method according to any one of claims 1, 2, 4 or 7, wherein said phenolic compound having at least 3 hydroxyl groups in the molecule is selected from the group consisting of 1,1,3-tris-(5-t-butyl-4-hydroxy-2-methylphenyl) butane; octadecyl-3-(3',5'-di-t-butyl-4'-hydroxyphenyl)-propionate; tris-(3,5-di-t-butyl-4-hydroxybenzyl) isocyanurate; and 1,3,5-trimethyl-2,4,6-tris (3,5-di-t-butyl-4-hydroxybenzyl) benzene.

12. The method according to claim 9, wherein said phenolic compound having at least 3 hydroxyl groups in the molecule is selected from the group consisting of 1,1,3-tris-(5-t-butyl-4-hydroxy-2-methylphenyl) butane; octadecyl-3-(3',5'-di-t-butyl-4'-hydroxyphenyl)-propionate; tris-(3,5-di-t-butyl-4-hydroxybenzyl) isocyanurate; and 1,3,5-trimethyl-2,4,6-tris (3,5-di-t-butyl-4-hydroxybenzyl) benzene.

* * * * *